United States Patent [19]

Suzuki et al.

[11] Patent Number: 5,196,385
[45] Date of Patent: Mar. 23, 1993

[54] PROCESS FOR THE PREPARATION OF A HEAT-RESISTANT AND WEAR RESISTANT CERAMIC MATERIAL

[75] Inventors: Junichiro Suzuki; Minoru Nakamura, both of Aichi, Japan

[73] Assignee: NGK Spark Plug Co., Ltd., Aichi, Japan

[21] Appl. No.: 639,774

[22] Filed: Jan. 14, 1991

Related U.S. Application Data

[63] Continuation of Ser. No. 503,087, Apr. 2, 1990, abandoned, which is a continuation of Ser. No. 296,288, Jan. 11, 1989, abandoned, which is a continuation of Ser. No. 893,848, Aug. 6, 1986, abandoned.

[30] Foreign Application Priority Data

Aug. 6, 1985 [JP] Japan .................. 60-173519

[51] Int. Cl.⁵ .................................. C04B 35/56
[52] U.S. Cl. ............................ 501/87; 501/93; 501/105; 51/309; 252/520
[58] Field of Search ............. 501/87, 93, 105; 51/309; 252/520

[56] References Cited

U.S. PATENT DOCUMENTS

| | | | |
|---|---|---|---|
| 3,565,643 | 2/1971 | Bergna | 501/87 OR |
| 3,886,254 | 5/1975 | Tanaka et al. | 501/87 X |
| 4,331,048 | 5/1982 | Dworak et al. | 501/150 X |
| 4,419,311 | 12/1983 | Claussen et al. | 510/105 X |
| 4,506,024 | 3/1985 | Claussen et al. | 501/105 OR |
| 4,804,645 | 2/1985 | Ekstrom | 501/105 |

FOREIGN PATENT DOCUMENTS

| | | | |
|---|---|---|---|
| 0174463 | 3/1986 | European Pat. Off. | 501/87 |
| 0185477 | 10/1983 | Japan | 501/87 |
| 0102863 | 6/1984 | Japan | 501/93 |
| 0050903 | 3/1985 | Japan | 501/93 |
| 8066402 | 4/1985 | Japan | 501/93 |

Primary Examiner—Karl Group
Attorney, Agent, or Firm—Sughrue, Mion, Zinn, Macpeak & Seas

[57] ABSTRACT

A process for preparation of heat-resistant and wear-resistant ceramic material which comprises sintering the material under a non-oxidizing atmosphere until the metal of a component (a) no longer exists as a metallic phase. A starting composition for forming the ceramic material comprises from 1 to 40 wt % of $Al_2O_3$, from 0.05 to 8 wt % of sintering assistant, from 3 to 35 wt % total of one or both of $ZrO_2$ and $HfO_2$, and from 17 to 95.95 wt % of carbide components (a) and (b), or (a), (b), and (c), wherein component (a) is one or more metals selected from the Groupd IVB, VB, and VIB of the Periodic Table; component (b) is TiC, and component (c) is one or more metal carbides selected from Zr, Hf, and metals of Groups VB and VIB of the Periodic Table.

2 Claims, 1 Drawing Sheet

PROCESS FOR THE PREPARATION OF A HEAT-RESISTANT AND WEAR RESISTANT CERAMIC MATERIAL

This is a continuation of application Ser. No. 07/503,087 filed Apr. 2, 1990, now abandoned, which is a continuation of application Ser. No. 07/296,288, filed Jan. 11, 1989, now abandoned, which is a continuation of application Ser. No. 06/893,848 filed Aug. 6, 1986, now abandoned.

FIELD OF THE INVENTION

This invention relates to a ceramic material which is excellent in heat resistance as well as in wear resistance and a process for preparation thereof, and more particularly to a ceramic material which is useful as cutting tools for ductile iron, etc., or as electrically conductive ceramics such as, for example, ceramic heaters, electrode materials requiring wear resistance and corrosion resistance, etc. and a process for preparation thereof.

BACKGROUND OF THE INVENTION

Heretofore, it has been known that TiC is a high temperature bearing material having an excellent spalling resistance because it has high melting point, high hardness, and small coefficient of thermal expansion with its thermal conductivity remaining relatively constant even at high temperatures. However, TiC is a material which is scarcely capable of sintering, so that its compact sintered product could be obtained only as a cermet by adding a metal such as Co, Ni, etc.

Since the above-described cermet is a composite body which is governed by the behavior of the metallic phase, the above-described characteristics, especially the high temperature characteristics of the TiC itself cannot be optimally utilized.

For instance, in the cutting of ductile iron, the cermet tip utilizing the above-described cermet is used in the finish cutting, but even in the finish cutting, at high speed cutting such as of a cutting speed exceeding 300 m/min, the tip wears rapidly, showing considerable cratering wear, and further it is very subject to chipping. On the contrary, at a cutting speed less than from 150 to 200 m/min, deposition takes place resulting in the roughness of the finished surface, though not so serious as in the cemented carbide tip.

SUMMARY OF THE INVENTION

The object of the present invention, which was achieved to solve the above-described problems, is to make the most of the characteristics of TiC as well as to provide a process for preparation of compact ceramic material.

According to a first embodiment of the present invention, a heat-resistant and wear-resistant ceramic material is provided, which is formed from a starting composition comprising from 1 to 40 wt. % of $Al_2O_3$, from 0.05 to 8 wt. % of sintering assistant, from 3 to 35 wt. % total of one or both of $ZrO_2$ and $HfO_2$, and from 17 to 95.95 wt. % of a carbide component composed of components (a) and (b), wherein
 component (a) is from 4 to 30 wt. % of one or more metals selected from the group consisting of metals of Groups IVB, VB, and VIB of the Periodic Table, and
 component (b) is from 70 to 96 wt. % of TiC.

According to a second embodiment of the present invention, a heat-resistant and wear-resistant ceramic is provided, which is material formed from a starting composition comprising from 1 to 40 wt. % of $Al_2O_3$, from 0.05 to 8 wt. % of sintering assistant, from 3 to 35 wt. % total of one or both of $ZrO_2$ and $HfO_2$, and from 17 to 95.95 wt. % of a carbide component composed of components (a), (b), and (c), wherein
 component (a) is from 4 to 30 wt. % of one or more metals selected from the group consisting of metals of Groups IVB, VB, and VIB of the Periodic Table,
 component (b) is from 70 to 96 wt. % of TiC, and
 component (c) is from 5 to 40 wt. % of carbides of one or more metals selected from the group consisting of Zr, Hf, and metals of Groups VB and VIB of the Periodic Table.

According to a third embodiment of the present invention, a process is provided for preparation of a heat-resistant and wear-resistant ceramic material formed from a starting composition comprising from 1 to 40 wt. % of $Al_2O_3$, from 0.05 to 8 wt. % of sintering assistant, from 3 to 35 wt. % total of one or both of $ZrO_2$ and $HfO_2$, and from 17 to 95.95 wt. % of a carbide component composed of components (a) and (b), which process comprises sintering the composition under a non-oxidizing atmosphere until the metal of said component (a) no longer exists as a metallic phase, wherein
 component (a) is from 4 to 30 wt. % of one or more metals selected from the group consisting of metals of Groups IVB, VB, and VIB of the Periodic Table, and
 component (b) is from 70 to 96 wt. % of Tic.

According to a fourth embodiment of the present invention, a process is provided for preparation of heat-resistant and wear-resistant ceramic material comprising from 1 to 40 wt. % of $Al_2O_3$, from 0.05 to 8 wt. % of sintering assistant, from 3 to 35 wt. % total of one or both of $ZrO_2$ and $HfO_2$, and from 17 to 95.95 wt. % of carbide component which is composed of compounds (a), (b), and (c), which process comprises sintering under a non-oxidizing atmosphere until component (a) no longer exists as a metal phase, wherein
 component (a) is from 4 to 30 wt. % of one or more metals selected from the group consisting of metals of Groups IVB, VB, and VIB of the Periodic Table;
 component (b) is from 30 to 91 wt. % of TiC, and
 component (c) is from 5 to 40 wt. % of carbides of one or more metals selected from the group consisting of Zr, Hf, and metals of Groups VB and VIB in the Periodic Table.

BRIEF DESCRIPTION OF THE DRAWING

The drawing shows an oblique view of the material being cut which was used in the examples of this invention.

DETAILED DESCRIPTION OF THE INVENTION

Figure 1:
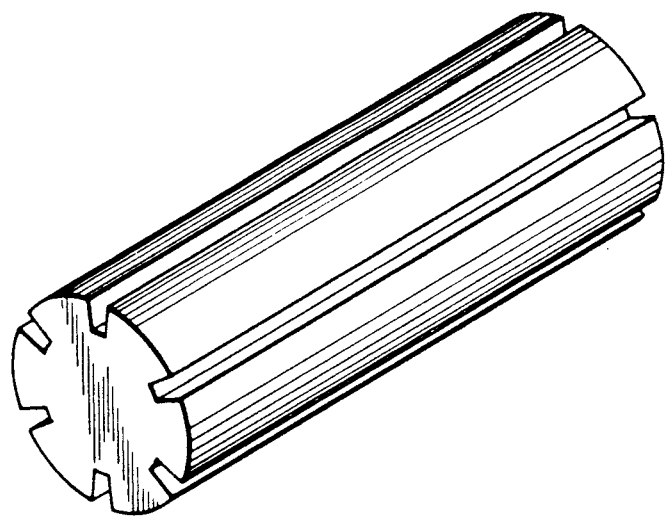

The terminology "a metal no longer exists as a metallic phase" as used herein means that a metallic phase cannot be detected at least by the aid of an X-ray diffraction apparatus, under the conditions as set forth below.

| Condition of X-ray Diffraction | |
| --- | --- |
| Target | Cu |
| $K_\beta$ Filter | Ni or monochromator |
| Voltage | 35–50 KV |
| Amperage | 30–100 mA |
| Full Scale | 200–20000 cps |
| Time Constant | 0.5–4 sec. |

-continued

| Condition of X-ray Diffraction | |
| --- | --- |
| Scanning Speed | 1¼ degree/min. |
| Chart Speed | 1–4 cm/min. |
| Take-off Angle | 6° |
| Divergence Slit | ½–2° |
| Receiving Slit | 0.15–0.6 mm |

As the non-oxidizing atmosphere it is sufficient if an atmosphere does not oxidize the TiC and the metal of component (a) in the mixture at the time of sintering, and there is no particular limitation thereto, so that, for example, an atmosphere of $N_2$, Ar, $H_2$, etc., may be used. Further, the above-described mixture can be sintered not only under ordinary atmospheric pressure, but also by a pressure sintering process or a hot isostatic pressure process, and the sintering temperature may be in the range conventionally used, for example, 1600° to 1900° C. in ordinary pressure sintering or pressurized sintering, and 1400° to 1800° C. in hot isostatic pressure, but as described above, it is necessary to sinter until the metallic phase in the mixture no longer exists.

Now with regard to the first embodiment of the invention, further explanation is set forth below.

$Al_2O_3$ is a chemically stable substance whose oxidation resistance is excellent and whose free energy of formation is low, and by dispersing this substance in the TiC component, the oxidation resistance and the chemical stability of a ceramic material as a whole can be improved. For this reason, to the excellent characteristics of TiC there can be further added oxidation resistance and chemical stability.

In this invention $Al_2O_3$ is used in an amount of from 1 to 40 wt. %, but when the amount of $Al_2O_3$ is less than 1 wt. %, the above-described effect is almost indiscernible, whereas when larger than 40 wt. % the characteristics of TiC itself are masked.

The reason why a sintering assistant is used in combination with $Al_2O_3$ in this invention is that in addition to the above-described effect of $Al_2O_3$, the compound resulting from the $Al_2O_3$ and the sintering assistant assists the sintering and improves the sintering property. The terminology "sintering assistant" as used herein designates those which are known for use in sintering a ceramic composed chiefly of $Al_2O_3$ usually in the $Al_2O_3$ system, $Al_2O_3$-TiC system, $Al_2O_3$-$ZrO_2$ system, etc., containing MgO, CaO, $SiO_2$, NiO, or oxides of rare earth metals such as $Y_2O_3$, $Dy_2O_3$, $Er_2O_3$, $Ho_2O_3$, etc.

In this invention the sintering assistant is used in an amount of from 0.05 to 8 wt. %; hen its amount is less than 0.05 wt. %, the above-described effect is almost indiscernible, whereas when larger than 8 wt. %, a large amount of the above-described $Al_2O_3$ compound degrades the high temperature characteristics of the ceramic material.

One or both of $ZrO_2$ and $HfO_2$ are usually dispersed in the form of crystals belonging to the tetragonal system in the ceramic material. When a large force is applied on a ceramic material, these crystals undergo phase transition from the tetragonal crystal to monoclinic crystal form, whereby the ceramic material is strengthened by the absorption of the external force. Such an effect is quite the same as what is known as non-diffusing lattice metamorphosis.

In this invention the $ZrO_2$ and $HfO_2$ are used in a total amount of from 3 to 35 wt. %. When its amount is less than 3 wt. %, the above-described effect is almost indiscernible, whereas when larger than 35 wt. %, the wear resistance of the sintered product is lowered.

Next, a carbide component composed of components (a) and (b) or (a), (b) and (c) is used in an amount of 17 to 95.95 wt. % based on a total amount. In order to further improve properties, particularly in hardness and characteristics at higher temperature, an amount of carbide component is preferably 50 to 95.95 wt. %.

The metal of the above-described component (a) is contained in the component (b), TiC, but it is necessary that this component (a) is allowed to dissolve in the component (b), TiC, to form a solid solution in the course of sintering in order to ensure the absence of the metallic phase in the ceramic material. Thus, the TiC becomes non-stoichiometric in composition, and the crystal structure can be made incomplete and unstable. Since this facilitates the sintering reaction such as solid phase reaction, or the like, it may be considered that the sintering property of the ceramic material could be improved in accordance with this invention. Also, this phenomenon implies that the boundary surfaces between $Al_2O_3$ particles and TiC particles or among the TiC particles each other are strengthened. Further, though not as yet fully elucidated, with regard to the high temperature strength of the TiC itself also, it is considered that since the bond type which is originally covalent bond is tinged with the metallic bond character, the strength can be improved in the aspect of toughness.

In this invention, in order to impart the above described characteristics, from 4 to 30 wt. % on the basis of the carbide component of component (a) is used, but when the amount of component (a) is less than 4 wt. %, the above-described effect is insufficient, whereas when larger than 30 wt. %, there is a possibility that component (a) remains a metallic phase, so that the wear resistance is lowered from the viewpoint of the machinability.

Examples of component (a) in the first and second embodiments of the invention, that is, metals of Groups IVB, VB, and VIB of the Periodic Table, include Ti, Zr, Hf, V, Nb, Ta, Cr, Mo, and W.

Turning to the effect of the second embodiment of the invention, further explanation is set forth below.

In the second embodiment, in addition to the components described for the first embodiments, the above-described component (c) is incorporated in the carbide component. Component (c) dissolves in the component (b), TiC, forming a solid solution, but as the atoms of the TiC and component (c) differ in size from each other, the crystal having such lattice distortion requires a larger energy for the dislocation movement than does the flat lattice plane on which atoms of the same size are in an orderly arrangement. That is to say, in order to break such a ceramic material more energy is required, and therefore, the strength of the ceramic material can be improved by the use of component (c).

In the second embodiment of the invention, in order to impart the above-described characteristics, component (c) is used in an amount less than 5 wt. %, the above-described characteristics do not appear, turning out to be the first invention. Whereas when larger than 40 wt. %, all the excellent characteristics of the TiC itself are degraded.

Examples of component (c) in the second embodiment of the invention, that is, carbides of Zr, Hf, and metals of Groups VB and VIB of the Periodic Table, include the carbides of Zr, Hf, V, Nb, Ta, Cr, Mo, and W such as, for example, ZrC, HfC, VC, NbC, TaC, Cr$_3$C$_2$, Mo$_2$C, WC, etc.

With reference to the Examples this invention is explained in further detail below. Unless otherwise specified, % indicates weight %.

EXAMPLES

Mixtures were prepared in the mixture ratios shown by Sample Nos. 1-a through 1-k in Table 1 as the examples of the first embodiments of the invention and in the mixture ratios shown by Sample Nos. 2-a through 2-k in the same table as the examples of the second embodiments of the invention, and these were all wet ground for 30 hours together with acetone in a stainless steel ball mill. Then the acetone was vaporized in a dryer, and the powder of the raw material mixture was prepared by pulverizing in a mortar until all the material passed through a 60-mesh screen. The amounts of components (a), (b), and (c) in the carbide component in Table 1 is given in wt. % on the basis of the weight of the TiC component. In addition, as to the α-Al$_2$O$_3$ used, 70% of it was less than 1 μm in particle diameter, the sintering assistant had a purity of 99.5% or more, the ZrO$_2$ had an average particle diameter of 0.6 μm, the HfO$_2$ had an average diameter of 1.5 μm. As the above-described component (a), one was used that passed through a 325-mesh screen; as component (b), that is, the TiC, one having an average particle diameter of 1.1 μm and a total carbon content of 19.4% was used; and, as component (c) used in the second embodiment of the invention, one passed through a 325-mesh screen were respectively used.

These powders of raw material mixtures were sintered at the sintering temperatures and by the sintering processes shown in Table 1. The sintering processes used in these Examples were as follows:

1. Sintered in a graphite mold by pressure sintering process under the conditions: pressure 200 kg/cm$^2$ and ignition time 15 min. (designated as H.P in the table).

2. Sintered for 1 hour under diminished pressure in an atmosphere of argon (designated as ordinary in the table).

3. In the first stage sintered for 1 hour under diminished pressure in an atmosphere of argon, and then further sintered by hot isostatic pressure process under the conditions: 1,500° C., 1,500 Kg/cm$^2$, holding time of 2 hours (designated as HIP in the table).

The sintered products obtained in the above-described way were ground by means of a diamond grinder to SNGN 432 TN, less than 3 S on the upper surface (according to Japanese Industrial Standard (JIS B 0601)), and after the relative density and hardness were measured, cutting tests were carried out under the conditions as shown in Table 2. In addition, the material being cut was, as shown in the drawing, of a cylindrical form, 400 mm long and 150 mm in diameter, in the longitudinal direction of which 6 grooves, 5 mm wide, were equidistantly provided. Further, the above-described sintered products were examined for the state of component (a) by the aid of an X-ray diffraction apparatus of RU-200V, manufactured by Rigaku Denki K.K. under the condition as set below.

| Condition of X-ray Diffraction | |
|---|---|
| Target | Cu |
| Kβ Filter | monochromator graphite(002) |
| Voltage | 50 KV |
| Amperage | 100 mA |
| Full Scale | 1000 cps |
| Time Constant | 2 sec. |
| Scanning Speed | ¼ degree/min. |
| Chart Speed | 4 cm/min. |
| Take-off Angle | 6° |
| Divergence Slit | 1° |
| Receiving Slit | 0.3 mm |

Besides the above, mixtures were also prepared in the mixture ratio shown by sample Nos. 1'-a through 1'-i in Table 1 as the comparative examples for the first embodiment of the invention and the mixture ratios shown by sample Nos. 2'-a through 2'-f in Table 1 as the comparative examples for the second embodiment of the invention, and sintered and formed in the same manner as in the examples, and after the relative density and hardness were measured, the cutting tests were carried out. Similarly to the examples they were also examined for the state of component (a) by the aid of an X-ray diffraction apparatus as afore-mentioned, etc. In Table 1, however, as the TiC cermet use was made of a commercially available product.

From the comparison between sample Nos. 1-a through 1-k and sample Nos. 1'-a through 1'-i and the comparison between sample Nos. 2-a through 2-k and sample Nos. 2'-a through 2'-f in Table 1, it was found that in order to make the most of the characteristics of TiC and to manufacture a compact ceramic material it is necessary that Al$_2$O$_3$, sintering assistant, one or both of ZrO$_2$ and HfO$_2$, and components (a) and (b) or, in the second embodiment of the invention components (a), (b), and (c) in the carbides component are used respectively in the predetermined amounts described above, and further that sintering is carried out until the above-described component (a) no longer exists as a metallic phase.

On the other hand, the electrical conductivity of the ceramic materials prepared in accordance with the process for preparation of ceramic material of this invention was measured, and it was found to be about from 50 to 100×10$^{-6}$ Ω.cm, though different depending on the composition. It may be mentioned that this indicates one of the most excellent in electrical conductivity among the conventional ceramic materials in practical use.

Further, by measuring the effect of the second embodiment of the invention, it was confirmed as seen from sample No. 1-h and sample No. 2-j that the ceramic material prepared by adding WC, Mo$_2$C or Cr$_3$C$_2$ as the component (c) to the formula of the first embodiment of the invention is superior in toughness to the ceramic material prepared by the first embodiment of the invention, so that the impact number in the cutting test increased. It was also confirmed that when ZrC, HfC, or VC was added as component (c) to the formula compared with the ceramic material prepared by the first embodiment of the invention. It was further confirmed that when TaC was added as components (c) to the formula of the first embodiment of the invention, heat-resistance was improved, that is, the lowering of strength at high temperatures is suppressed. It was also confirmed that similar advantage was obtained by adding NbC as component (c) in place of TaC.

In addition, also with respect to the raw material mixtures in the formula of this invention that were not included in Table 1, sintered products were prepared and tests were made as above, whereby it was confirmed that the impact number counted until a defect was formed increased by a large margin as compared with the conventional materials.

TABLE 1

| | Al₂O₃ (wt %) | Sintering Assistant (wt %) | ZrO₂ or HfO₂ (wt %) | TiC Component wt % | (a) | (b) | (c) | Sintering Process | Sintering temp. (°C) | Relative density (%) | Hardness (H 45N) | Metallic phase | Impact number in cutting test |
|---|---|---|---|---|---|---|---|---|---|---|---|---|---|
| EXAMPLE | | | | | | | | | | | | | |
| *First Embodiment* | | | | | | | | | | | | | |
| 1-a | 10 | MgO 1 Dy₂O₃ 1 | ZrO₂ 10 | 78 | Ti 6.4 | 93.6 | — | Ordinary | 1800 | 98.5 | 89.5 | Absent | 3100 |
| 1-b | 5 | CaO 1 Y₂O₃ 1 | ZrO₂ 5 | 88 | Ti 6.8 | 93.2 | — | Ordinary | 1850 | 98.8 | 90.0 | " | 2800 |
| 1-c | 30 | MgO 1 | ZrO₂ 10 | 59 | Ti 6.8 | 93.2 | — | H·P | 1700 | 99.3 | 91.2 | " | 4800 |
| 1-d | 35 | MgO 1 | HfO₂ 12 | 52 | V 15.4 | 84.6 | — | H·P | 1680 | 99.3 | 91.6 | " | 4000 |
| 1-e | 22 | MgO 1 Dy₂O₃ 1 | HfO₂ 6 | 70 | Hf 8.6 | 91.4 | — | H·P | 1750 | 99.3 | 91.6 | " | 4200 |
| 1-f | 34 | MgO 1 | ZrO₂ 14 | 51 | Ti 5.9, Ta 3.9 | 90.2 | — | H·P | 1700 | 99.4 | 91.1 | " | 4000 |
| 1-g | 20 | CaO 1 | ZrO₂ 19 | 60 | Ta 6.7, Hf 1.7 | 91.7 | — | H·P | 1700 | 99.2 | 91.6 | " | 4300 |
| 1-h | 18 | MgO 1 Dy₂O₃ 1 | ZrO₂ 11 | 69 | Nb 2.9, Ti 2.9 | 94.2 | — | H·P | 1700 | 99.5 | 91.7 | " | 3700 |
| 1-i | 13 | CaO 1 | HfO₂ 8 | 78 | W 8 | 92.0 | — | H·P | 1700 | 99.5 | 91.0 | " | 4300 |
| 1-j | 25 | MgO 1 Y₂O₃ 1 | ZrO₂ 10 | 63 | Mo 10 | 90.0 | — | H·P | 1700 | 99.3 | 90.8 | " | 4000 |
| 1-k | 20 | MgO 2 Dy₂O₃ 4 | ZrO₂ 7 | 67 | Ti 8 | 92.0 | — | H·P | 1650 | 99.4 | 90.7 | " | 3800 |
| *Second Embodiment* | | | | | | | | | | | | | |
| 2-a | 20 | CaO 1 Dy₂O₃ 1 | ZrO₂ 20 | 58.5 | Ti 15.4 | 67.5 | TaC 17.1 | H·I·P | 1750 | 99.5 | 91.7 | " | 3800 |
| 2-b | 25 | MgO 1 Y₂O₃ 1 | HfO₂ 9 | 60 | Ta 8.3 | 83.4 | Wc 8.3 | H·I·P | 1700 | 99.2 | 91.2 | " | 4100 |
| 2-c | 8 | Y₂O₃ 1 | ZrO₂ 16 | 75 | Nb 12 | 80.0 | ZrC 6.7 | H·P | 1700 | 99.5 | 91.4 | " | 4300 |
| 2-d | 19 | MgO 1 | ZrO₂ 6 HfO₂ 6 | 68 | Nb 10.3 | 60.3 | ZrC 29.4 | H·P | 1650 | 99.1 | 91.8 | " | 4000 |
| 2-e | 2 | MgO 1 | ZrO₂ 30 | 67 | Ti 19.4 | 65.7 | VC 14.9 | H·I·P | 1700 | 99.5 | 92.1 | " | 4600 |
| 2-f | 25 | MgO 1 Y₂O₃ 1 | ZrO₂ 15 | 58 | Hf 17.2 | 56.9 | HfC 25.9 | H·P | 1700 | 99.2 | 91.5 | " | 3900 |
| 2-g | 30 | Y₂O₃ 1 CaO 1 | ZrO₂ 18 | 50 | V 16 | 68 | ZrC 16 | H·I·P | 1700 | 99.5 | 91.3 | " | 3800 |
| 2-h | 7 | MgO 1 | ZrO₂ 6 | 86 | W 5 | 85 | WC 10 | H·I·P | 1750 | 99.4 | 91.6 | " | 4500 |
| 2-i | 14 | Dy₂O₃ 1 Y₂O₃ 1 | HfO₂ 9 | 75 | Mo 7 | 73 | TaC 20 | H·P | 1700 | 99.5 | 91.1 | " | 4000 |
| 2-j | 20 | MgO 1 Dy₂O₃ 1 | ZrO₂ 10 | 68 | Nb 2.5, Ti 3.0 | 84.5 | WC 10 | H·I·P | 1700 | 99.4 | 91.2 | " | 4300 |
| 2-k | 22 | MgO 1 Dy₂O₃ 1 | HfO₂ 12 | 61 | Nb 10 | 80 | TaC 20 | H·I·P | 1650 | 99.5 | 90.4 | " | 4000 |
| COMPARATIVE EXAMPLE | | | | | | | | | | | | | |
| *First Group* | | | | | | | | | | | | | |
| 1'-a | 0.5 | MgO 1 | ZrO₂ 15 | 83.5 | V 10 | 90 | — | H·I·P | 1800 | 97.7 | 90.0 | Absent | 1500 |
| 1'-b | 45 | CaO 1 Ho₂O₃ 1 | HfO₂ 9 | 44 | W 15 | 85 | — | H·I·P | 1650 | 99.4 | 88.8 | " | 1000 |
| 1'-c | 10 | MgO 0.01 | ZrO₂ 10 | 79.99 | Nb 12 | 88 | — | H·I·P | 1850 | 94.3 | 84.2 | " | 100 |
| 1'-d | 20 | CaO 5 Dy₂O₃ 5 | HfO₂ 20 | 50 | Ta 8 | 92 | — | H·I·P | 1700 | 98.9 | 88.0 | " | 500 |
| 1'-e | 30 | MgO 1 | ZrO₂ 1 | 68 | W 10 | 90 | — | Ordinary | 1750 | 99.2 | 91.0 | " | 2000 |
| 1'-f | 25 | CaO 1 Y₂O₃ 1 | ZrO₂ 40 | 33 | Ti 24.2 | 75.8 | — | H·P | 1700 | 98.5 | 88.2 | " | 800 |
| 1'-g | 25 | CaO 1 | ZrO₂ 10 | 64 | Nb 2 | 98 | — | H·P | 1750 | 99.3 | 90.5 | " | 1700 |
| 1'-h | 25 | MgO 1 Y₂O₃ 1 | ZrO₂ 15 | 58 | Ti 51.7 | 48.3 | — | Ordinary | 1650 | 99.0 | 90.2 | " | 500 |
| 1'-i | 25 | MgO 1 Dy₂O₃ 1 | ZrO₂ 20 | 63 | Mo 10 | 90 | — | H·I·P | 1500 | 98.4 | 89.2 | Present | 400 |
| *Second Group* | | | | | | | | | | | | | |
| 2'-a | 50 | MgO 1 | ZrO₂ 18 | 31 | Ta 19.4 | 64.5 | ZrC 16.1 | H·P | 1650 | 99.3 | 90.4 | Absent | 1000 |
| 2'-b | — | MgO 1 | ZrO₂ 9 | 90 | Ti 5.6 | 83.3 | VC 11.1 | H·I·P | 1850 | 98.1 | 88.6 | " | 100 |
| 2'-c | 20 | MgO 1 Dy₂O₃ 1 | ZrO₂ 1 | 77 | Hf 10.4 | 57.1 | TaC 32.5 | H·I·P | 1750 | 99.2 | 91.0 | " | 300 |
| 2'-d | 15 | CaO 1 Y₂O₃ 1 | ZrO₂ 10 | 73 | Ti 8 | 90 | WC 2 | Ordinary | 1800 | 98.2 | 89.1 | Present | 2500 |
| 2'-e | 25 | CaO 1 Y₂O₃ 1 | ZrO₂ 10 | 68 | Nb 14.7 | 41.2 | ZrC 44.1 | H·I·P | 1750 | 99.4 | 91.5 | " | 1300 |
| 2'-f | 5 | MgO 1 Dy₂O₃ 1 | ZrO₂ 15 | 78 | Ti 28 | 62 | ZrC 10 | H·I·P | 1600 | 98.5 | 88.1 | " | 1500 |
| TiC cermet | | TiC—TiN—MoC—Ni system | | | | | | | | 100 | 88.1 | — | 2000* |

*No defect was formed until 5000 times, but the wearing amount is large, and as the impact number counted until the ordinary criterion for judging life, a wearing depth 0.3 mm was reached after 2000 times, this may be taken to be the substantial life

TABLE 2

| | Cutting Test Conditions |
|---|---|
| Material being cut | FCD 55 (HB 230) |
| Cutting speed | 300 m/min |
| Feed rate | 0.55 mm/rev |
| Depth of cut | 1.5 mm |
| Cutting oil | water soluble |
| Life judgment | impact number until defect was formed |

While the invention has been described in detail and with reference to specific embodiments thereof, it will be apparent to one skilled in the art that various changes and modifications can be made therein without departing from the spirit and scope thereof.

What is claimed is:

1. A process for preparation of a heat-resistant and wear-resistant ceramic material formed from a starting composition consisting essentially of from 1 to 40 wt. % of $Al_2O_3$, from 0.05 to 8 wt. % of sintering assistant, from 3 to 30 wt. % total of one or both of $ZrO_2$ and $HfO_2$ in dispersed form, and from 50 to 95.95 wt. % of a carbide component composed of components (a) and (b), which process comprises sintering the composition under a non-oxidizing atmosphere until the metal of component (a) no longer exists as a metallic phase, wherein component (a) is from 4 to 30 wt. % based on the weight of the carbide component of one or more metals selected from the group consisting of metals of Groups IVB, VB, and VIB of the Periodic Table, component (b) is from 70 to 96 wt. % based on the weight of the carbide component of TiC, and said sintering assistant is one or more members selected from the group consisting of MgO, CaO, $SiO_2$, NiO, and oxides of rare earth metals.

2. A process for preparation of a heat-resistant and wear-resistant ceramic material formed from a starting composition consisting essentially of from 1 to 40 wt. % of $Al_2O_3$, from 0.05 to 8 wt. % of sintering assistant, from 3 to 20 wt. % total of 1 or both of $ZrO_2$ and $HfO_2$ in dispersed form, and from 50 to 95.95 wt. % of a carbide component composed of components (a), (b), and (c), which process comprises sintering the composition under a non-oxidizing atmosphere until the metal of said component (a) no longer exists as a metallic phase, wherein component (a) is from 4 to 30 wt. % based on the weight of the carbide component of one or more metals selected from the group consisting of metals of Groups IVB, VB, and VIB of the Periodic Table, component (b) is from 30 to 91 wt. % based on the weight of the carbide component of TiC, component (c) is from 5 to 40 wt. % based on the weight of the carbide component of carbides of one or more metals selected from the group consisting of Zr, Hf and metals of Groups IVB and VIB of the Periodic Table, and said sintering assistant is one or more members selected from the group consisting of MgO, CaO, $SiO_2$, NiO and oxides of rare earth metals.

* * * * *